Jan. 5, 1965 G. F. FALKENBERG 3,163,882
GROMMET ASSEMBLY
Filed May 17, 1963
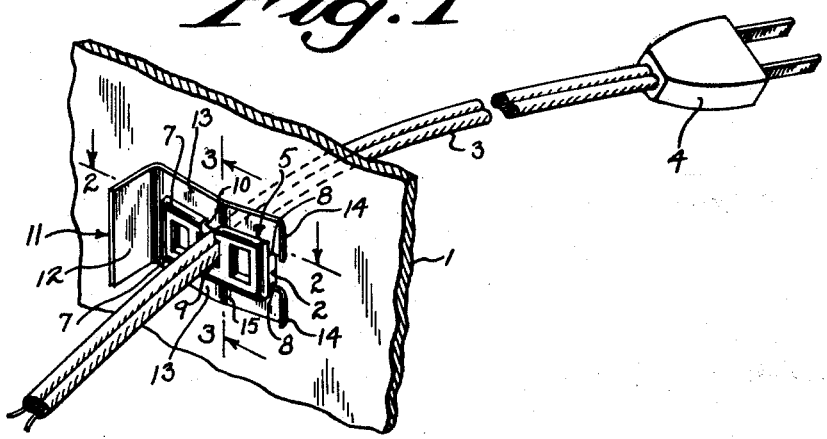
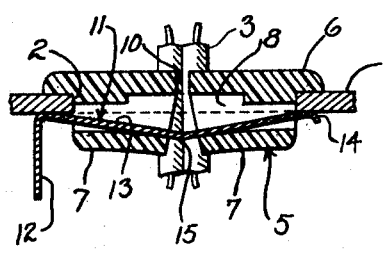 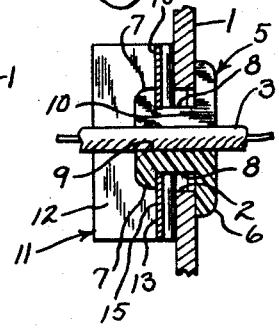 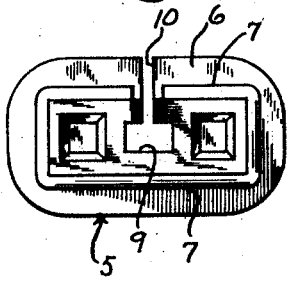
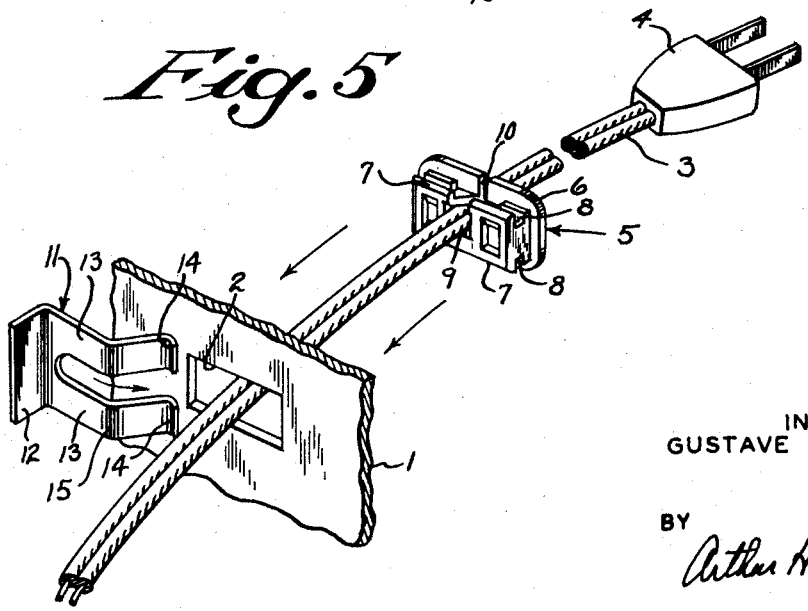
INVENTOR
GUSTAVE F. FALKENBERG
BY
ATTORNEY United States Patent Office 3,163,882
Patented Jan. 5, 1965

3,163,882
GROMMET ASSEMBLY
Gustave F. Falkenberg, Brookfield, Wis., assignor to Dimensional Products, Inc., Milwaukee, Wis., a corporation of Wisconsin
Filed May 17, 1963, Ser. No. 281,109
7 Claims. (Cl. 16—2)

This invention relates to grommets for closing off electrical cord passageways through, for example, the housings of electric clocks or similar appliances; and it resides more particularly in a grommet assembly comprising a grommet having a cord opening therethrough and which is adapted to close off a cord passageway; and a clip for holding the grommet in place.

Many electrical appliances include an electrical device, for example, a motor or light bulb, disposed behind a wall member such as a housing or reflector. Common examples of this type of appliance are clocks, timers, lights, and motorized or lighted displays. An electrical cord supplying device extends through the wall to be connected to the device, the cord being provided at its remote end with an electrical plug for connection into a power source. Presently available cords, especially those designed for household or equivalent use, usually have connecting plugs formed integrally with the cord so that they cannot be disconnected.

Appliances of the type described above usually have a relatively small cord passageway, just large enough to admit the cord itself. As a result, the cords and the devices they are intended to supply are usually furnished separately, and it is necessary in assembling the appliance to insert the wire through the cord passageway from the outside of the wall and then manually connect it to the device. Connecting cords in this manner requires a number of time-consuming steps: inserting the cord, stripping the insulation at the connecting end of the cord, cleaning the exposed wire, twisting in the case of multistrand wires, forming the wire around the terminal, tightening the terminal connection and finally capping or soldering the connection. The added labor costs resulting from these steps may well be a critical factor, especially for low priced, mass produced appliances.

A grommet assembly formed according to the present invention allows for the provision in a wall of a cord passageway that is large enough to allow an electrical plug to pass therethrough. Thus, the supplier of the electrical device can attach the cord during manufacture, which is a considerably less expensive procedure than attaching the cord during later assembly. Also, the use of electrical devices with previously attached cords solves a serious inventory problem otherwise confronting the assembler of the final appliance when it is necessary to stock equal numbers of devices and cords.

It is an object of this invention to provide a universal grommet assembly for electrical cords which has application for all forms of electrical appliances.

It is another object of this invention to provide a grommet assembly that will permit the plug of an electrical cord to be passed through the wall of an electrical appliance so that the appliance can be assembled with the cord having been previously attached to the device.

It is a further object of this invention to provide a grommet assembly which may be easily and quickly installed with a minimum of manual steps.

It is still another object of this invention to provide a grommet assembly wherein an electrical cord may be easily inserted into a cord opening in the grommet.

It is a still further object of this invention to provide a grommet formed of a soft, resilient material which makes it easy to insert an electrical cord therein, allows for the use of simple tools to further simplify insertion of the cord, and allows for the grommet to be deformed by a clip member when in place to help in holding the clip member in a clamping position.

It is still another object of this invention to provide a grommet assembly designed to accommodate walls of widely varying thicknesses.

It is a still further object of this invention to provide a grommet assembly in which a clip is locked in place to have a secure clamping action.

It is still another object of this invention to provide a grommet assembly which is sturdy and effective yet simple and inexpensive to manufacture.

Other objects and advantages will appear from the description to follow. In the description, reference is made to the accompanying drawing, forming a part hereof, in which there is shown by way of illustration and not of limitation a specific embodiment of the invention.

In the drawing:

FIG. 1 is a view in perspective showing a grommet assembly formed according to the invention in place on a wall with an electrical cord passing therethrough, FIG. 2 is a view in cross-section taken along the plane 2—2 shown in FIG. 1, FIG. 3 is a view in cross-section taken along the plane 3—3 shown in FIG. 1, FIG. 4 is a rear view in elevation of the grommet of the assembly shown in FIG. 1, and FIG. 5 is an exploded view in perspective of the grommet assembly, wall and cord shown in FIG. 1.

The reference numeral 1 in the drawing refers to the wall of, for example, a reflector housing for a lighted display (not shown). Since a grommet assembly formed according to this invention can have a wide variety of applications, and since its structure and operation can be understood without reference to any particular electrical appliance or other structure, the display referred to has not been shown or described herein.

The wall 1 is provided with a substantially rectangular aperture 2 which serves as a passageway for a conventional electrical cord 3 having at its remote end a plug 4 of usual configuration. The plug 4 is of substantially rectangular cross-section, and the passageway 2 is of such size as to permit the plug 4 to pass therethrough without interference.

The grommet assembly of the invention is intended to close off the aperture or passageway 2 after the plug 4 has been inserted therethrough and to hold the cord 3 against axial movement. The assembly comprises a grommet 5 which is of a generally rectangular, block-like configuration and is formed of a soft, resilient plastic material such as polyethylene. The front face of the grommet 5, that face which is to the right in FIG. 3, is provided with an outwardly extending feeding flange 6 which is circumjacent the grommet 5. Rearwardly of the flange 6, to the left as seen in FIG. 3, the grommet 5 is provided on its longer top and bottom sides with upstanding holding ridges 7 which extend along substantially the entire length of the grommet 5. The ridges 7 and flange 6 define therebetween a pair of parallel grooves 8 extending along the opposite upper and lower surfaces of the grommet 5 and are of relatively great width.

A substantially rectangular cord opening 9 extends through the grommet 5 from front to rear, and an externally opening vertical slot 10 communicates with the opening 9 and extends upwardly through the grommet 5. As can be seen in FIGS. 4 and 5, the sides of the slot 10 diverge from the front of the grommet 5 to the rear.

The grommet assembly of the invention also includes a resilient, sheet metal, U-shaped clip 11, seen most clearly in FIG. 5. The base of the clip 11 is turned upwardly to present an upstanding tab 12 for grasping the clip 11 as will be described. The legs 13 of the clip 11 are humped to give them a V-configuration with the remote ends of the legs 13 being turned upwardly to present locking projections 14.

The grommet assembly is quite simple to install. After the plug 4 has been inserted through the passageway 2, the grommet 5 is attached to the cord 3 and then appears as shown in FIG. 5. Insertion of the cord 3 into the grommet 5 is accomplished by means of the slot 10. In accordance with usual practice the cord 3, which has a substantially rectangular cross-section, is turned to a vertical position for insertion through the slot 10 and is returned to a horizontal position after it is in the opening 9. Insertion of the cord 3 is aided by the soft, resilient construction of the grommet 5 since it may easily be spread apart to expand the slot 10. If desired, a simple tool (not shown) may be used to effect spreading of the slot 10 and insertion of the cord 3. Insertion is also aided by the divergent walls of the slot 10 since these serve as a funnel-like guide and allow the cord 3 to be inserted starting at the rear of the grommet 5 in a shearing manner. The cord 3 has a relatively tight fit within the opening 9 and, if desired, integral ribs or other holding means may be formed in the opening 9 to further guarantee against axial movement of the cord 3.

After the grommet 5 is in place, it is either slid along or moved with the cord 3 to the wall 1. The passageway 2 is of sufficient size to admit the rear end of the grommet 5, with the ridges 7, without interference. The relatively larger sealing flange 6 cannot, however, be inserted through the passageway 2 and comes to rest on the outer surface of the wall 1, that surface to the top in FIG. 2 and to the right in FIG. 3. The flange 6 is substantially larger than the passageway 2 and extends outwardly on all sides thereof to engage the wall 1 to seal off the passageway 2.

When the flange 6 has engaged the wall 1, the grommet 5 is in the position shown in FIGS. 2 and 3 wherein the ridges 7 are disposed on the opposite side of the wall 1. The grooves 8 are of sufficient width so that they extend rearwardly of the wall 1. The clip 11 is then grasped by means of the tab 12 and the legs 13 are inserted in the groove 8 to straddle the grommet 5, the tab 12 making it easy to exert the required force. When fully inserted, the humped configuration of the legs 13 causes them to bear against the ridges 7, which constitute sides of the grooves 8, and the wall 1, as seen most clearly in FIGS. 2 and 3, to urge the grommet 5 to the right as seen in FIG. 3 thus clamping it in position.

As can be seen in FIG. 1, when the clip 11 has been fully inserted, the locking projections 14 are disposed to the side of the grommet 5 and they may be given a sufficient length to engage the grommet 5 to prevent the clip 11 from sliding out of place in normal use. The turned up ends of the legs 13 are also advantageous in providing smooth, rounded surfaces which can slide along the wall 1 without binding as the clip 11 is inserted. The soft, resilient construction of the grommet 5 also helps in providing a locking action since the ridges 7 are deformed by the relatively stronger V-shaped clip legs 13, as seen most clearly in FIG. 2, into a corresponding V-shape. These mating shapes then serve to prevent the clip 11 from sliding out of place, and on the side of the grommet 5 interrupted by the slot 10 the apex 15 of the V-shaped leg 13 fits firmly into the slot 10 to enhance the locking of the clip 11 in place.

The relatively wide grooves 8 enable the grommet assembly of the invention to be used with walls of widely varying thicknesses. The height of the hump in the legs 13, the distance from their apices to plane at the base of the clip 11, is approximately equal to the width of the grooves 8 so that the clip 11 is effective to hold the grommet 5 in place even if the wall 1 is very thin. The legs 13 are, however, capable of being flattened to a great degree so that the assembly may also be used for very thick walls. A grommet assembly formed according to this invention may easily accommodate walls varying in thickness from thin sheet metal walls approximately .015 inch in thickness to plastic walls which may be several times thicker.

Although a preferred embodiment of the invention has been shown and described herein, it should be apparent that a number of changes might be made without departure from the invention. The invention is not, therefore, intended to be limited except insofar as limitations appear in the following claims.

I claim:

1. A grommet assembly comprising: a block-like grommet having a front face, an outwardly extending seating flange adjacent the front face, a pair of grooves rearwardly spaced from the flange and disposed on opposite sides of the grommet, a cord opening extending through the grommet from front to rear, and a slot communicating with the cord opening along the entire length of the opening, which slot opens outwardly to provide a cord receiving slot along one side of the grommet running from the front to the rear of the grommet; and a U-shaped clip having resilient legs disposed in the grooves to straddle the grommet, said assembly being characterized in that it is adapted to close off a cord passageway through a wall with the flange in engagement with one surface of the wall and the grooves and clip on the other side of the wall with the legs of the clip engaging the sides of the grooves and the wall to urge the flange tightly against the wall.

2. A grommet assembly comprising: a block-like grommet formed of a soft, resilient material and having a front face, an outwardly extending seating flange adjacent the front face, a pair of holding ridges rearwardly spaced from the flange and disposed on opposite sides of the grommet to define with the flange a pair of grooves on opposite sides of the grommet, a cord opening extending through the grommet from front to rear, an outwardly opening slot communicating with the cord opening along the entire length of the opening to provide a cord receiving slot along one side of and extending from the front to the rear of the grommet; and a U-shaped clip having an upstanding manually engageable tab member at its base and resilient, humped legs disposed in the grooves to straddle the grommet, said assembly being characterized in that it is adapted to close off a cord passageway through a wall with the flange in engagement with one surface of the wall and the ridges and clip disposed on the other side of the wall with the legs of the clip engaging the ridges and wall to urge the flange tightly against the wall.

3. A grommet assembly comprising: a grommet having a body of length and width greater than that of an electrical plug, a seating flange on one side of the body, a ridge on the other side of the body, a groove formed between the flange and ridge, and a cord opening in the form of a slot extending through the grommet and opening outwardly along the entire length of one side of the body to allow a cord to be inserted from said side; and a resilient clip disposed lengthwise in said groove which is adapted to apply lateral pressure upon a wall after insertion of the grommet into a cord passageway in such wall and thereby resiliently grasp the wall between said seating flange and said clip with the clip being between the wall and said ridge.

4. A grommet assembly comprising: a block-like grommet formed of a soft, resilient material and having a front face, an outwardly extending seating flange adjacent the front face, a pair of holding ridges rearwardly spaced from the flange and disposed on opposite sides of the grommet to define with the flange a pair of relatively wide grooves on opposite sides of the grommet, a cord opening extending through the grommet from front to rear, an outwardly opening slot communicating with the cord opening along the entire length of the opening to provide a cord receiving slot along one side of and extending from the front to the rear of the grommet; and a U-shaped clip member formed of resilient sheet material and having an upstanding manually engageable tab member at its base and resilient, humped legs disposed in the grooves to straddle the grommet, the height of the humps in the legs of the clip being approximately equal to the width of the grooves in the grommet, said assembly being characterized in that it is adapted to close off a cord passageway through a wall with the flange in engagement with one surface of the wall and the ridges and clips disposed on the other side of the wall with the legs of the clip engaging the ridges and wall to urge the flange tightly against the wall.

5. A grommet assembly comprising: a block-like grommet formed of a soft, resilient material and having a front face, an outwardly extending seating flange adjacent the front face, a pair of holding ridges rearwardly spaced from the flange and disposed on opposite sides of the grommet to define with the flange a pair of grooves on opposite sides of the grommet, a cord opening extending through the grommet from front to rear, an outwardly opening slot communicating with the cord opening along the entire length of the opening to provide a cord receiving slot along one side of and extending from the front to the rear of the grommet, the side walls of said slot being divergent; and a U-shaped clip having an upstanding manually engageable tab member at its base and resilient, humped legs disposed in the grooves to straddle the grommet, said assembly being characterized in that it is adapted to close off a cord passageway through a wall with the flange in engagement with one surface of the wall and the ridges and clip disposed on the other side of the wall with the legs of the clip engaging the ridges and wall to urge the flange tightly against the wall.

6. A grommet assembly comprising: a block-like grommet formed of a soft resilient material and having a front face, an outwardly extending seating flange adjacent the front face, a pair of holding ridges rearwardly spaced from the flange and disposed on opposite sides of the grommet to define with the flange a pair of grooves on opposite sides of the grommet, a cord opening extending through the grommet from front to rear, an outwardly opening slot communicating with the cord opening along the entire length of the opening to provide a cord receiving slot, said slot extending along one side of the grommet from the front to the rear of the grommet and passing through one of the holding ridges to interrupt the same; and a U-shaped clip having an upstanding manually engageable tab member at its base and resilient, humped legs disposed in the grooves to straddle the grommet, said assembly being characterized in that it is adapted to close off a cord passageway through a wall with the flange in engagement with one surface of the wall and the ridges and clip disposed on the other side of the wall with the legs of the clip engaging the ridges and wall to urge the flange tightly against the wall, the apex of the hump of one of the legs being located approximately at the point where the cord receiving slot passes through said one of the holding ridges, said one clip leg being of sufficient resilient strength to deform said one ridge to provide a surface mating with the humped configuration of said one clip leg to hold the clip against longitudinal movement with respect to the grommet.

7. A grommet assembly comprising: a block-like grommet formed of a soft, resilient material and having a front face, an outwardly extending seating flange adjacent the front face, a pair of soft, resilient holding ridges rearwardly spaced from the flange and disposed on opposite sides of the grommet to define with the flange a pair of relatively wide grooves on opposite sides of the grommet, a cord opening extending through the grommet from front to rear, an outwardly opening slot communicating with the cord opening along the entire length of the opening to provide a cord receiving slot along one side of and extending from the front to the rear of the grommet, the side walls of said slot being divergent, said slot passing through one of the holding ridges; and a U-shaped clip formed of sheet material and having an upstanding manually engageable tab member at its base and resilient, humped legs disposed in the grooves to straddle the grommet, the height of the humps being approximately equal to the width of the grooves, the apex of the hump of one of the legs being approximately at the point where the cord receiving slot extends through said one of the holding ridges, said one clip leg being of such resilient strength as to be adapted to deform said one holding ridge to a configuration mating with the humped leg of said one clip to hold the same against longitudinal movement with respect to the grommet, the legs of the clip being provided at their ends with upturned lock projections engageable with the grommet to hold the clip against longitudinal movement with respect to the grommet, said assembly being characterized in that it is adapted to close off a cord passageway through a wall with the flange in engagement with one surface of the wall and the ridges and clip disposed on the other side of the wall with the legs of the clip engaging the ridges and wall to urge the flange tightly against the wall.

References Cited in the file of this patent

UNITED STATES PATENTS

| | | |
|---|---|---|
| 1,056,392 | Barr et al. | Mar. 18, 1913 |
| 1,483,218 | Fahnestock | Feb. 12, 1924 |
| 2,188,596 | Hobert | Jan. 30, 1940 |
| 2,365,785 | Tinnerman | Dec. 26, 1944 |
| 2,715,216 | Howenstine | Aug. 9, 1955 |